United States Patent [19]

Kiesow

[11] 4,103,697
[45] Aug. 1, 1978

[54] SAFETY SENSOR DEVICE

[76] Inventor: Herbert L. Kiesow, 3251 E. Artesia, Long Beach, Calif. 90805

[21] Appl. No.: 789,783

[22] Filed: Apr. 22, 1977

[51] Int. Cl.² ............... F16K 17/36; H01H 35/02
[52] U.S. Cl. ................................ 137/45; 200/61.53
[58] Field of Search ............. 116/114 AH; 137/38, 137/39, 45, 46; 200/61.45 R, 61.53

[56] References Cited

U.S. PATENT DOCUMENTS

| 3,745,277 | 7/1973 | Shawcross | 200/61.45 R X |
| 3,878,858 | 4/1975 | Yamada | 137/38 |

FOREIGN PATENT DOCUMENTS 5,132 of 1914 United Kingdom ............... 137/45

Primary Examiner—Robert G. Nilson
Attorney, Agent, or Firm—Fulwider, Patton, Rieber, Lee & Utecht

[57] ABSTRACT

A safety sensor device for automatically shutting off the flow of fluids such as water, gas, oil or steam, or shutting off electric power, or actuating an alarm in the event of an earthquake or other violent shock. The device includes a spring-loaded shut-off member normally held in a retracted position by a latch. A pendulum is connected to the latch so that upon the occurrence of an earthquake or other violent shock, movement of the pendulum will release the latch. The latch will then be spring activated to an extended shut-off position. The sensitivity of the device is controllable.

7 Claims, 5 Drawing Figures

SAFETY SENSOR DEVICE

BACKGROUND OF THE INVENTION

1. Field of the Invention

The present invention relates to automatic safety sensor devices for automatically shutting off fluid flow or electric power in areas subject to earthquakes or other shocks.

2. Description of the Prior Art

Pipelines conveying inflammable fluids such as gas and oil or steam are liable to be ruptured by earthquakes or shocks. Such earthquakes or shocks can also expose electric current conducting cables. As a result, a serious hazard of explosion and fires exists. Various automatically operated shut-off devices have been devised in the past. Such devices, however, have not met with widespread acceptance. Such lack of acceptance appears to be due to the inability of the prior art devices to function in an emergency.

SUMMARY OF THE INVENTION

The safety sensor device of the present invention is simple and foolproof of construction whereby it will always function in an emergency. This result is achieved by utilizing a few simple operating parts which can remain in an operable condition over long periods of disuse. Additionally, the safety sensor device of the present invention is adjustable with respect to the magnitude of the earthquake or shock required to actuate such device.

The objects and advantages of the present invention are obtained by providing an automatic safety sensor device utilizing a shut-off arm member which is normally maintained in a retracted position completely free of the medium to be controlled. Such shut-off arm is spring-loaded to an operative position wherein it will shut off the flow of the medium to be controlled. The arm is maintained in its retracted position by means of a latch finger normally held in engagement with the arm. The latch finger is interconnected to a pendulum through an adjustment mechanism. Upon the occurrence of an earthquake or other shock, the pendulum will move so as to release the latch finger. The adjustment mechanism permits the amount of pendulum movement required to effect such release to be varied in accordance with the conditions and location of use of the safety sensor device.

Other objects and advantages of the present invention will become apparent from the following detailed description.

DESCRIPTION OF THE PREFERRED EMBODIMENTS

Figure 1:
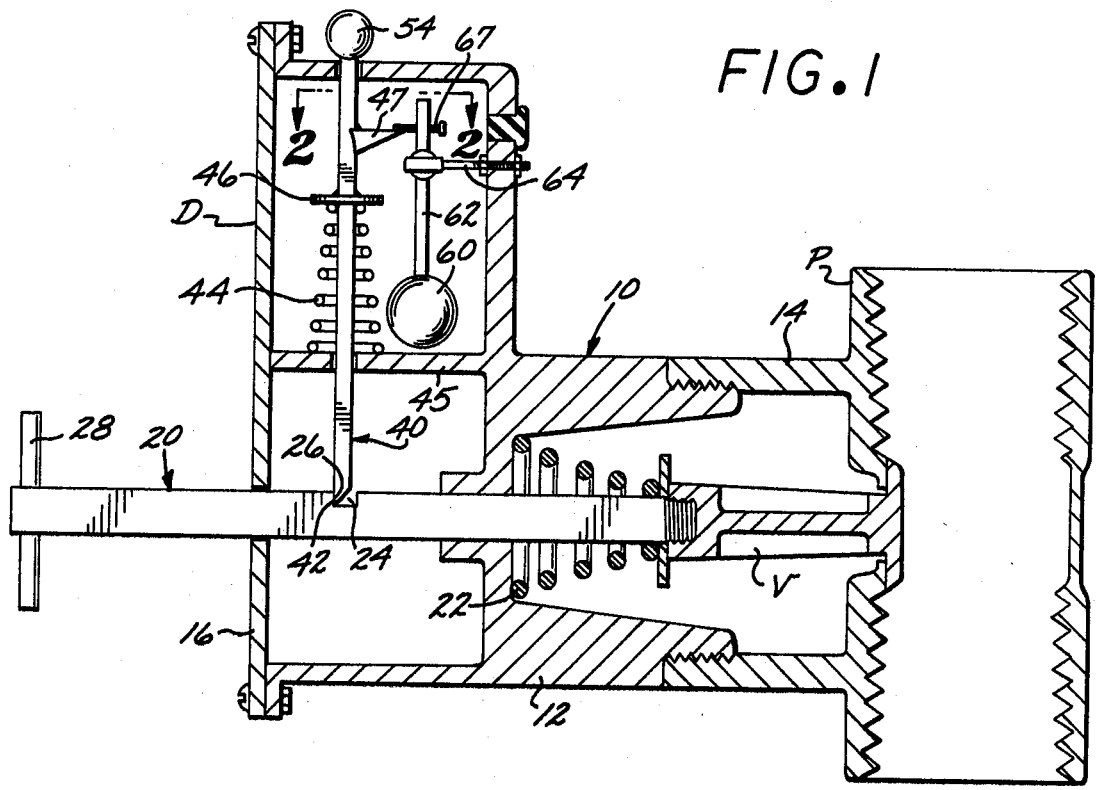
FIG. 1 is a vertical central sectional view of a first form of safety sensor device embodying the present invention.
Figures 2, 4:
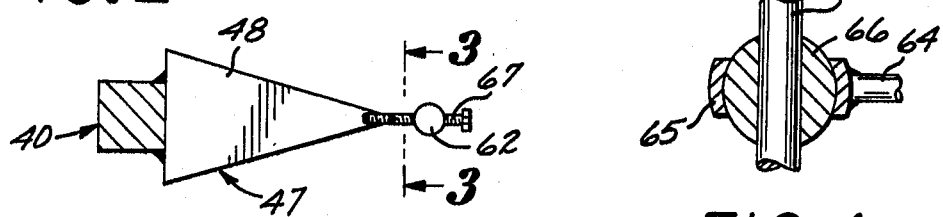
FIG. 2 is a horizontal sectional view taken in enlarged scale along line 2—2 of FIG. 1.
FIG. 4 is a vertical sectional view taken along line 4—4 of FIG. 1.
Figures 3, 5:
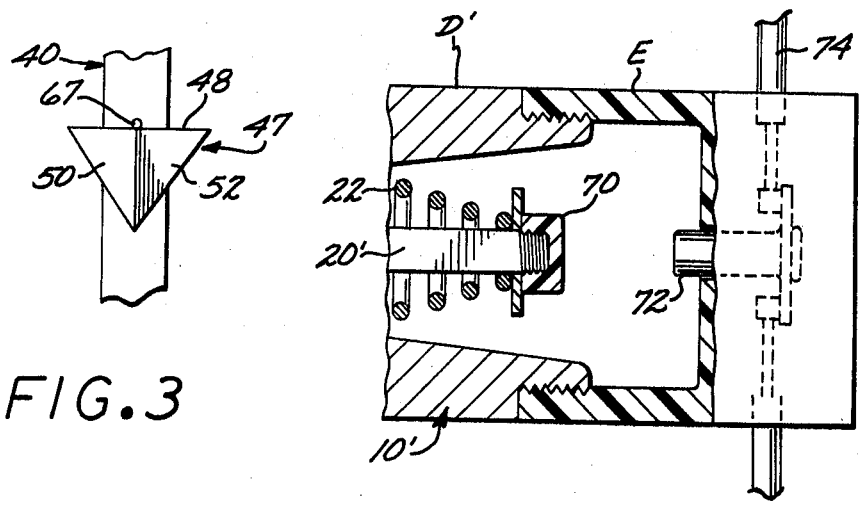
FIG. 3 is a vertical sectional view taken along line 3—3 of FIG. 2.
FIG. 5 is a fragmentary central vertical section of a second form of safety sensor device embodying the present invention.

Referring to the drawings, there is shown in FIGS. 1, 2 and 3 a first preferred embodiment of a safety sensor device D embodying the present invention. Such safety sensor device D is shown in conjunction with a pipefitting P. For descriptive purposes, the pipefitting P may be assumed to be in communication with a pipe or pipeline (not shown) carrying a fluid such as gas, oil, steam or water. The midportion of pipefitting P is provided with a valve V shown in its retracted or open position in solid outline in FIG. 1. The solid outline position of the valve V shown in FIG. 1 would be the normal position such valve would assume during nonemergency conditions, i.e., fluid would be free to flow through pipefitting P and the pipeline to which such fitting is attached.

The safety sensor device D includes a body 10 formed with a front boss portion 12 that is threadably secured to a complementary boss 14 formed on pipefitting P. The rear end of body 10 is closed by a plate 16. The body 10 supports of shut-off arm, generally designated 20, for horizontal linear movement relative thereto from a retracted position shown in solid outline in FIG. 1 to an extended position shown in dotted outline in such Figure. A coil spring 22 constantly biases arm 20 towards its extended position. The intermediate portion of arm 20 is formed with a pocket 24, the rear surface of which defines a stop 26. The rear end of arm 20 is formed with a cross-piece 28 by means of which the arm may be manually moved from its extended to its retracted position.

Body 10 also supports a vertical latch finger, generally designated 40, such latch finger being capable of linear movement relative to body 10 towards and away from arm 20 in a direction normal to such arm. The pointed lower end of latch finger 40 defines a rear latch surface 42 which is normally disposed within pocket 24 in abutment with stop 26. Latch finger 40 is constantly biased upwardly away from arm 20 by means of a second coil spring 44 that extends between a wall 45 of body 10 and a retainer 46 formed on such latch finger. The upper portion of arm 40 is provided with a pad 47. Pad 47 has a flat upper surface 48, and as indicated particularly in FIG. 3, is of triangular configuration when viewed from the top and front with the sides of such pad tapering downwardly to provide triangular side surfaces 50 and 52. The upper end of latch finger 40 extends out of the body 10 and is provided with a ball 54 which may be manually grasped so as to effect linear movement of such latch relative to body 10.

Body 10 also supports a pendulum 60, such pendulum being carried at the lower end of a vertical rod 62. The intermediate portion of such rod 62 is connected to body 10 by means of a horizontal support 64, one end of such support being threadably affixed to body 10. The free end of the support 64 is attached to rod 62 in such a manner that movement of pendulum 60 upon the application of an earthquake or other shock to body 10 will cause the upper portion of rod 62 to undergo concurrent movement. Thus, referring to FIG. 4, the free end of post 64 is rigidly affixed to a ring 65 that rotatably houses a sphere 66 secured to rod 62 to thereby define a universal joint between such support and rod. A suitable lubricant may be provided for such joint. A threaded post or set screw 67 is adjustably carried by the upper portion of rod 62 for horizontal movement towards and away from pad 46. Post 67 normally overlies the upper surface 48 of pad 47, as indicated in FIG. 2. With reference to such figure, it will be noted that post 67 may be advanced towards and away from pad surface 48 by rotation of such post relative to rod 62.

In the operation of the aforedescribed safety sensor device, the parts thereof will normally be disposed in their positions of FIGS. 1, 2 and 3. At this time, valve V will be arranged in its retracted position whereby fluid is free to flow through pipefitting P. Upon the application of a shock to body 10, pendulum 60 will move relative to such body, thereby effecting concurrent movement of rod 62. Such rod movement will in turn cause movement of post 67 relative to pad 47 whereby the post will no longer overlie pad surface 48. Spring 44 will then be free to raise latch finger 40 so as to move the latch surface 42 thereof upwardly out of engagement latch arm stop 26. Spring 22 will then snap shutoff arm 20 and valve V into the extended forward position shown in dotted outline in FIG. 1 whereby valve V will immediately stop the flow of fluid through pipefitting P. The safety sensor device D may be readily reactivated by pulling shut off arm 20 towards its retracted position until pocket 24 is again in alignment with the lower end of latch finger 40. Latch finger 40 may then be pushed downwardly by ball 54 until its lower end is again positioned within pocket 24. During such downward movement, pad 47 will cam post 66 aside because of the downwardly tapered sides 50 and 52 of such pad.

Referring now to FIG. 5, a modified form of the aforedescribed safety sensor device D' is shown connected to an electric switch E. The part of device D' shown in FIG. 4 may be considered to be the same as described hereinabove, with the exception that the front end of shut-off arm 20' is formed with a bumper 70 that engages the rear end of an electric switch element 72 when the latch arm 20' snaps forwardly upon the application of a shock to body 10'. The electric switch element 72 is normally maintained in a closed position relative to an electric conduit 74. It will accordingly be apparent that the flow of electric current through such conduit 74 will be automatically shut off upon forward movement of shut off arm 20'.

It should be understood that conduit 74 could be a part of an alarm system which would be activated by opening of switch element 72.

Various other modifications and changes may be made with respect to the foregoing detailed description without departing from the spirit of the present invention.

I claim:

1. A safety sensor device, comprising:
 a body;
 a shut off arm supported on said body for linear movement relative thereto between a normal retracted position and an extended operative position;
 spring means biasing said arm towards its operative position;
 a stop formed on said arm;
 a latch finger supported on said body for linear movement relative thereto towards and away from said arm, said latch finger having a latch surface engageable with said stop to normally retain said arm in its retracted position;
 second spring means biasing said latch finger away from said arm;
 a pendulum secured to one end of a rod that is secured to said body;
 a post supported by said rod; and
 a pad carried by said latch, said pad including a triangular surface that tapers towards said post with said post normally overlapping said triangular surface to prevent movement of said latch finger away from said arm, and with movement of said pendulum relative to said body causing said post to be moved out of the path of said pad whereby said latch finger will move away from said arm and the latter will be urged to its operative position.

2. A safety sensor device as set forth in claim 1, wherein:
 said post is adjustably supported by said rod for movement towards and away from said pad.

3. A safety sensor device as set forth in claim 2, wherein:
 the sides of said pad taper downwardly.

4. A safety sensor device as set forth in claim 2, wherein:
 said post is connected to said rod by a universal joint.

5. A safety sensor device as set forth in claim 1, wherein:
 the sides of said pad taper downwardly.

6. A safety sensor device as set forth in claim 5, wherein:
 said post is connected to said rod by a universal joint.

7. A safety sensor device as set forth in claim 1, wherein:
 said post is connected to said rod by a universal joint.

* * * * *